(12) United States Patent
Wolfe

(10) Patent No.: US 10,233,896 B2
(45) Date of Patent: *Mar. 19, 2019

(54) STEAM-ASSISTED GRAVITY DRIVE SYSTEM

(71) Applicant: Zachary David Wolfe, Houston, TX (US)

(72) Inventor: Zachary David Wolfe, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/670,437

(22) Filed: Aug. 7, 2017

(65) Prior Publication Data

US 2018/0238296 A1 Aug. 23, 2018

Related U.S. Application Data

(60) Provisional application No. 62/461,414, filed on Feb. 21, 2017.

(51) Int. Cl.
| | | |
|---|---|---|
| *F01K 1/06* | (2006.01) | |
| *F01K 1/14* | (2006.01) | |
| *F03B 7/00* | (2006.01) | |
| *F03G 7/00* | (2006.01) | |
| *F01K 21/00* | (2006.01) | |
| *F01K 27/02* | (2006.01) | |
| *F03B 13/00* | (2006.01) | |
| *F03B 17/00* | (2006.01) | |

(52) U.S. Cl.
CPC .............. *F03B 17/005* (2013.01); *F03G 7/00* (2013.01); *F01K 1/06* (2013.01); *F01K 1/14* (2013.01); *F01K 21/005* (2013.01); *F01K 27/02* (2013.01); *F03B 7/00* (2013.01); *F03B 13/00* (2013.01); *F05B 2210/13* (2013.01); *Y02E 10/20* (2013.01)

(58) Field of Classification Search
CPC ..... F03G 3/00; F03G 3/06; F03G 6/00; F03G 6/06
USPC ................... 60/495–507, 641.8, 641.15, 670
See application file for complete search history.

(56) References Cited

U.S. PATENT DOCUMENTS 4,012,911 A * 3/1977 Gulko ..................... F03G 3/00
 60/531
6,892,539 B2 5/2005 Jarman

FOREIGN PATENT DOCUMENTS

FR 2570441 A1 * 3/1986 ............... F03G 3/00

* cited by examiner

*Primary Examiner* — Mark A Laurenzi
*Assistant Examiner* — Mickey H France
(74) *Attorney, Agent, or Firm* — Dunlap Bennett & Ludwig PLLC

(57) ABSTRACT

A phase-shift-assisted gravity drive system is provided. The phase-shift-assisted gravity drive system has a series of repeating phase-shift chambers separated by inner baffles, wherein the series of repeating steam chambers define a circular loop about a hub. The phase-shift-assisted gravity drive system with the addition of a heat source is adapted to unidirectionally change steam from one phase-shift chamber to spraying condensation flowing into an adjacent phase-shift chamber. Thereby, the phase-shift-assisted gravity drive system generates force through this unidirectional transfer of the fluid throughout the loop of phase-shift chambers so that the loop rotates about its hub under the further influence of gravity, wherein the hub can be attached to a mechanism for applying rotation force thereto.

10 Claims, 4 Drawing Sheets

STEAM-ASSISTED GRAVITY DRIVE SYSTEM

CROSS-REFERENCE TO RELATED APPLICATION

This application claims the benefit of priority of U.S. provisional application No. 62/461,414, filed 21 Feb. 2017, the contents of which are herein incorporated by reference.

BACKGROUND OF THE INVENTION

The present invention relates to mechanical drives and, more particularly, to a steam-assisted gravity drive system enabling mechanical drive through harnessing heat sources, often wasted, that instead are operatively associated with the steam-assisted gravity drive system.

SUMMARY OF THE INVENTION

In one aspect of the present invention, a steam-assisted gravity drive system includes a series of connection tubes defining a loop, wherein each pair of adjacent connection tubes of the series of connection tubes are interconnected by a steam drive chamber; each steam drive chamber defines a chamber space as the steam drive chamber extends from an entry end to an opposing condensing end, both such ends interconnect said pair of adjacent connection tubes; and each condensing end providing a condensing eyelet fluidly connecting to the chamber space, wherein the condensing eyelet is adapted to change a substance from a gaseous phase to a liquid phase.

In another aspect of the present invention, the steam-assisted gravity drive system includes a series of connection tubes defining a loop, wherein each pair of adjacent connection tubes of the series of connection tubes are interconnected by a steam drive chamber; each steam drive chamber defines a chamber space as the steam drive chamber extends from an entry end to an opposing condensing end, both such ends interconnect said pair of adjacent connection tubes; each connection tube extends between a condensation end to a gaseous end, wherein each condensation end is fluidly connected to the condensing end of an associated steam drive chamber; each condensing end providing a condensing eyelet fluidly connecting to the chamber space, wherein the condensing eyelet is adapted to change a substance from a gaseous phase to a liquid phase; a hub disposed at a center of the loop; a plurality of spaced apart supports radially extend from the hub to the loop; and a heat source operatively associated with each condensation end.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a steam-assisted gravity drive system having a series of repeating steam chambers separated by inner baffles, wherein the series of repeating steam chambers define a circular loop about a hub. The steam-assisted gravity drive system with the addition of a heat source is adapted to unidirectionally change steam from one steam chamber to a spraying condensation flowing into an adjacent steam chamber, which in turn is changed to steam that flows to yet another adjacent stream chamber. Thereby, the steam-assisted gravity drive system generates rotational force through this unidirectional transfer of the fluid throughout the circular loop of steam chambers so that the loop rotates about its hub under the further influence of gravity, wherein the hub can be attached to a mechanism for applying rotation force thereto.

Figure 1:
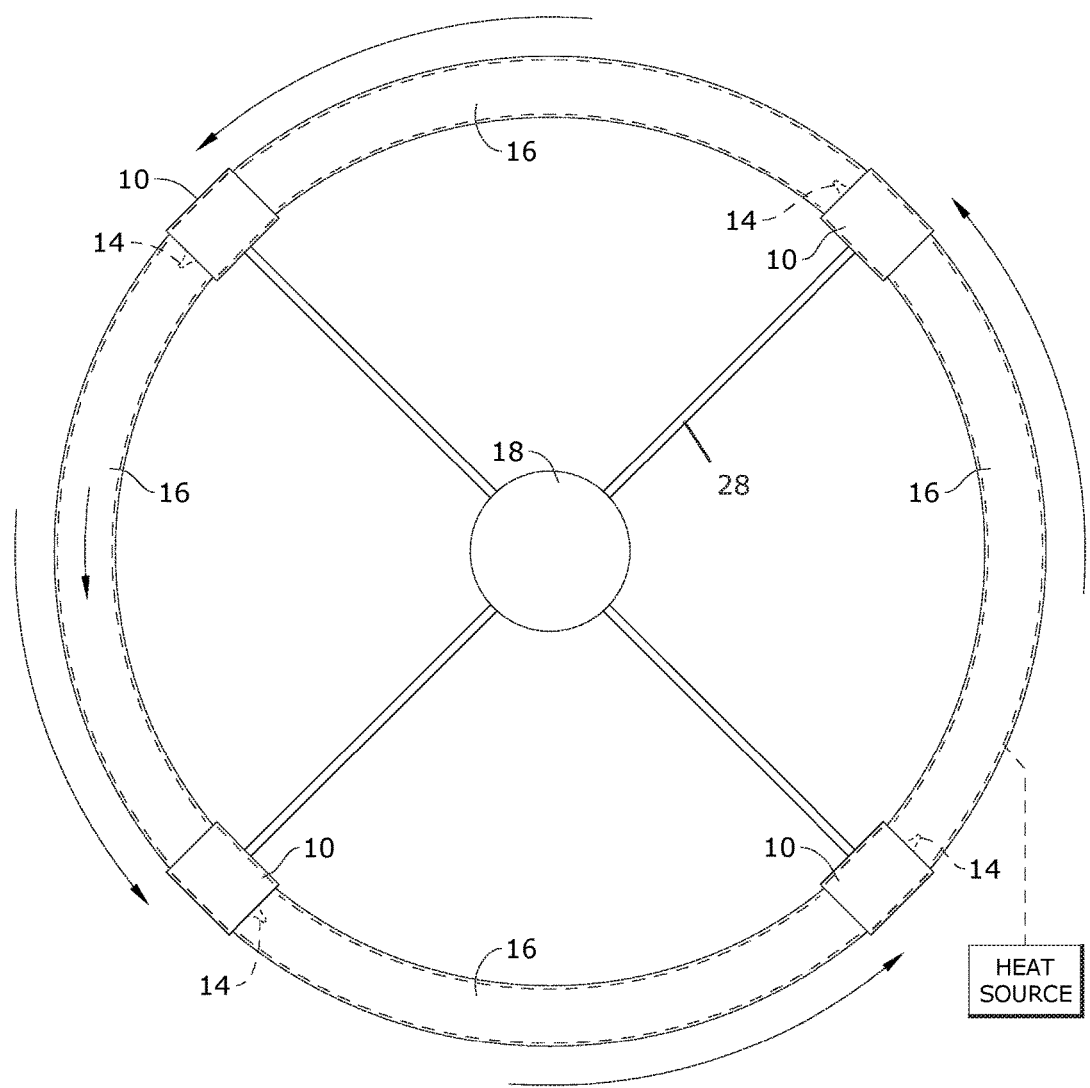
FIG. 1 is a schematic view of an exemplary embodiment of the present invention.

Referring to FIGS. 1 through 4, the present invention may include a phase-shift-assisted gravity drive system 100 having a series of connection tubes 16 separated by phase-shift drive chambers 10 so as to form the shape of a circular wheel, as illustrated in FIG. 1. In certain embodiments, the "wheel' may provide a hub 18 having radially extending, spaced apart support "spokes" 28 connecting the hub 18 to the phase-shift drive chambers 10. The connection tubes 16 and phase-shift drive chambers 10 may be made from material enabling joining methods that withstand the pressures contemplated by the disclosure herein. In certain embodiments, the material may be metal enabling the tubes 16 and phase-shift drive chambers 10 to be welded or braised to resist the pressures from conversion of water to steam and vice versa.

Figure 2:
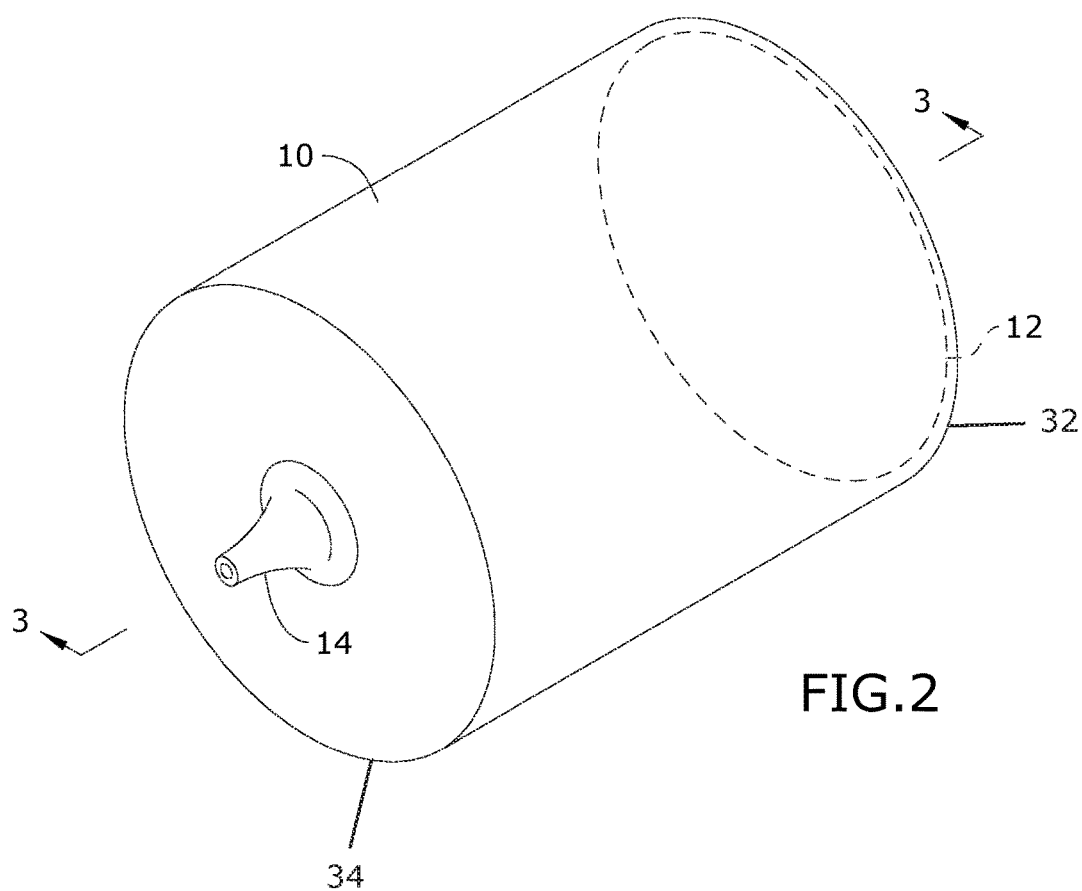
FIG. 2 is a perspective view of a chamber 10 of an exemplary embodiment of the present invention.
Figure 3:
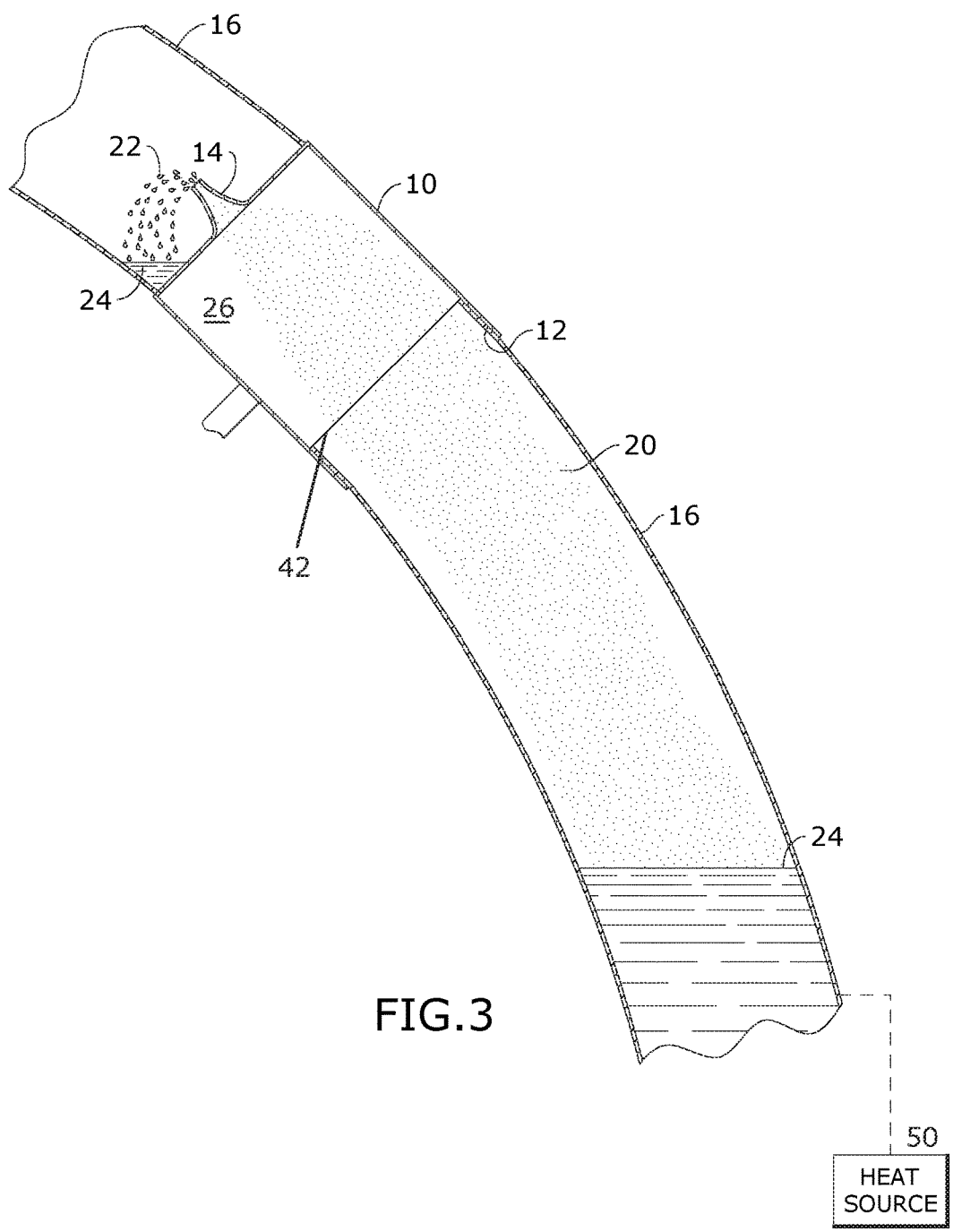
FIG. 3 is a section view of an exemplary embodiment of the present invention, taken along line 3-3 of FIG. 2, illustrating eyelet 14 condensing stream 20 and spraying droplet.

Referring to FIG. 2, each phase-shift drive chamber 10 provides a fluid connection between two connection tubes 16 as the phase-shift drive chamber 10 extends from an entry end 32 to an opposing condensing end 34. The connection tubes 16 curve as they extend from a condensation end 44 to an opposing gaseous end 42. In certain embodiments, the gaseous end 42 of a first connection tube 16 may connect to the entry end 32 so that at a gas 20 may fluidly flow from within the first connection tube 16 through the entry end and into a chamber space 26 defined by the associated phase-shift drive chamber 10. Each condensing end 34 provides a condensing eyelet or spout 14 fluidly connected to the chamber space 26. Each condensing eyelet or spout 14 may be dimensioned and adapted to act as an asymmetric inner baffle that changes the gaseous phase of the gas 20 flowing through the chamber space 26 to its liquid phase, providing a liquid spraying 22 of the resultant fluid 24 into the condensation end 44 of an adjacent second connection tube 16, as illustrated in FIG. 3 and FIG. 2; specifically, the spout 14 may non-linearly converge as it extends away from the condensing end 34, or in other words the spout 14 converges as it extends from a first end associated with the condensing end 34 to a second distal end. In the embodiment of the gas 20 being steam/water vapor, the condensing eyelet or spout 14 condenses said steam (or water vapor) 20 to spraying water 22 flowing into the condensation end 44. Whereby, the condensation end 44 fills with the resultant fluid 24.

The condensation end 44 may be provided with an additional heat source 50. The heat source 50 may be internally or externally provided. The heat source 50 changes the liquid fluid 24 into heated gaseous form 20, which migrates or rises toward the gaseous end 42 and into the condensing chamber 10, wherein the condensing eyelet or spout 14 changes the gaseous form 20 back into the liquid phase 24 spraying into the condensation end 44 of the adjacent connection tube 16.

Figure 4:
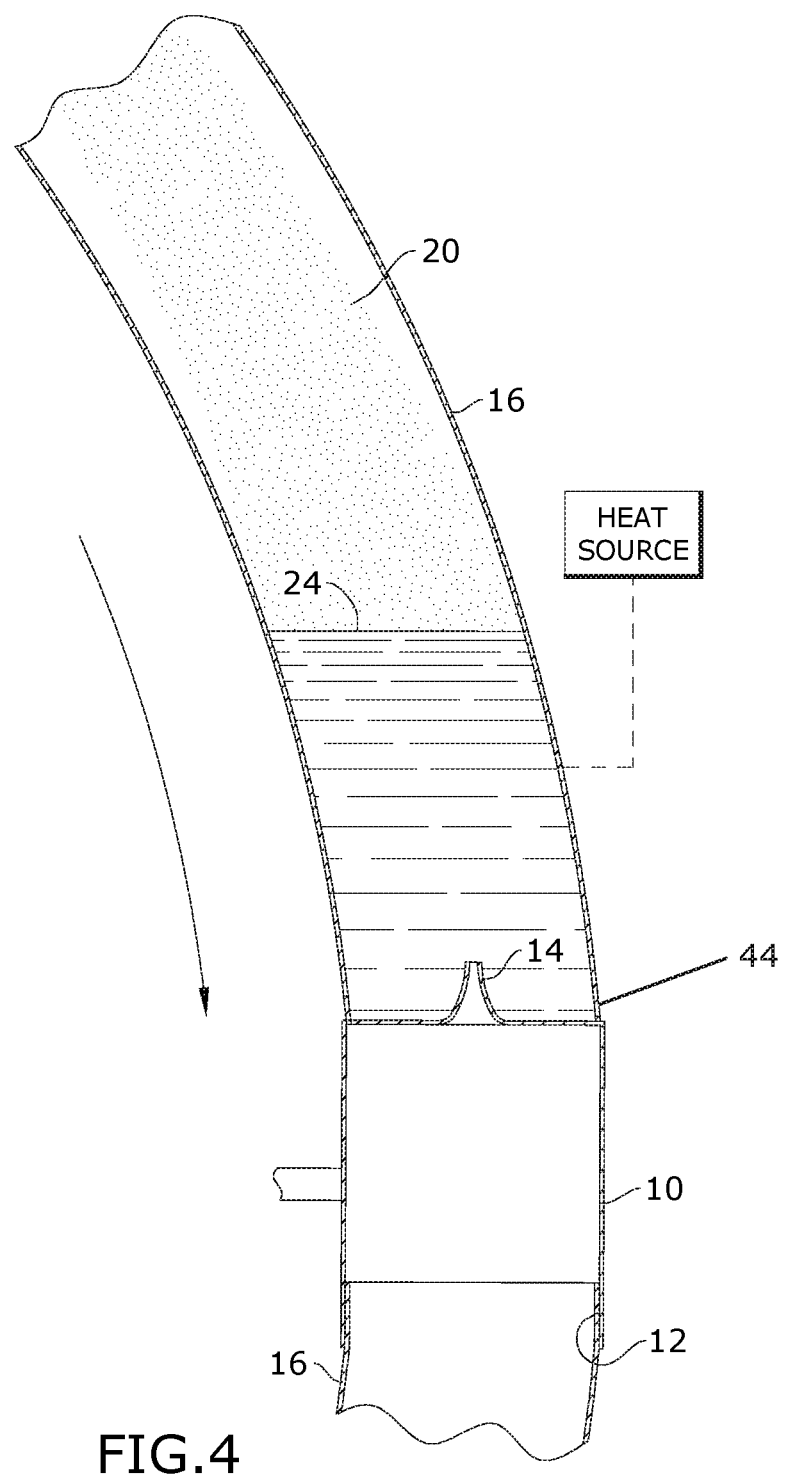
FIG. 4 is a section view of an exemplary embodiment of the present invention, illustrating the movement of chambers 10 and tubes 16 around hub 18 as water 24 fills the tubes.

In effect, the phase-shift-assisted gravity drive system 100 provides a series of repeating phase-shift chambers 10 and connection tubes 16 separated by inner baffles so that adjacent connection tubes 16 are fluidly connected by condensing eyelets or spouts 14. The condensing eyelets or spouts 14 drive the spraying condensation 22 unidirectionally through the series of connection tubes 16 of the phase-shift-assisted gravity drive system 100 as the heat source 50 transfers heat to the otherwise closed system gas exchange. Thereby, the phase-shift-assisted gravity drive system 100 generates force through the unidirectional transfer of the fluid forcing the series of tubes 16 to rotated about its hub 18 under the influence of gravity as the resulting fluid 24 sequentially accumulates in adjacent condensation ends 44, as illustrated in FIG. 4. The increasing mass of the accumulating resulting fluid 24 in a first connection tube 16 rotates the phase-shift-assisted gravity drive system 100 about the hub 18, whereby the resulting fluid 24 migrates via its rising gaseous form 20 to the adjacent second connection tube 16, which in turn is urged to similarly rotate under the influence of gravity.

A method of using the present invention may include the following. The phase-shift-assisted gravity drive system 100 disclosed above may be provided. The hub 18 may be coupled to various mechanisms to provide torque or rotational force thereto. In certain embodiments, the hub 18 may be coupled to an axial impingement to facilitate the motion of any attached objects or gearing. Likewise, the hub 18 may be attached to a number of items requiring locomotion.

It should be understood, of course, that the foregoing relates to exemplary embodiments of the invention and that modifications may be made without departing from the spirit and scope of the invention as set forth in the following claims.

What is claimed is:

1. A phase-shift-assisted gravity drive system, comprising:
    a series of connection tubes defining a loop, wherein each pair of adjacent connection tubes of the series of connection tubes are interconnected by a phase-shift drive chamber;
    each phase-shift drive chamber defines a chamber space as the phase-shift drive chamber extends from an entry end to an opposing condensing end, both such ends interconnect said pair of adjacent connection tubes; and
    each condensing end providing a condensing spout fluidly connecting to the chamber space, wherein the condensing spout converges from a first end to a distal second end so as to change a substance from a gaseous phase to a liquid phase.

2. The phase-shift-assisted gravity drive system of claim 1, further comprising a hub disposed at a center of the loop.

3. The phase-shift-assisted gravity drive system of claim 2, further comprising a plurality of spaced apart supports radially extend from the hub to the loop.

4. The phase-shift-assisted gravity drive system of claim 1, further comprising a heat source operatively associated with each connection tube.

5. The phase-shift-assisted gravity drive system of claim 4, wherein the heat source is external to the loop.

6. The phase-shift-assisted gravity drive system of claim 4, wherein each connection tube extends between a condensation end to a gaseous end, wherein each condensation end is fluidly connected to the condensing end of an associated phase-shift drive chamber, and wherein the heat source is operatively associated with each condensation end.

7. The phase-shift-assisted gravity drive system of claim 1, wherein the substance is water housed in the loop.

8. A phase-shift-assisted gravity drive system, comprising:
    a series of connection tubes defining a loop, wherein each pair of adjacent connection tubes of the series of connection tubes are interconnected by a phase-shift drive chamber;
    each phase-shift drive chamber defines a chamber space as the phase-shift drive chamber extends from an entry end to an opposing condensing end, both such ends interconnect said pair of adjacent connection tubes;
    each connection tube extends between a condensation end to a gaseous end, wherein each condensation end is fluidly connected to the condensing end of an associated phase-shift drive chamber;
    each condensing end providing a condensing spout fluidly connecting to the chamber space, wherein the condensing spout converges from a first end to a distal second end so as to change a substance from a gaseous phase to a liquid phase;
    a hub disposed at a center of the loop;
    a plurality of spaced apart supports radially extend from the hub to the loop; and
    a heat source operatively associated with each condensation end.

9. The phase-shift-assisted gravity drive system of claim 8, wherein the heat source is external to the loop.

10. The phase-shift-assisted gravity drive system of claim 8, wherein the substance is water housed in the loop.

* * * * *